UNITED STATES PATENT OFFICE.

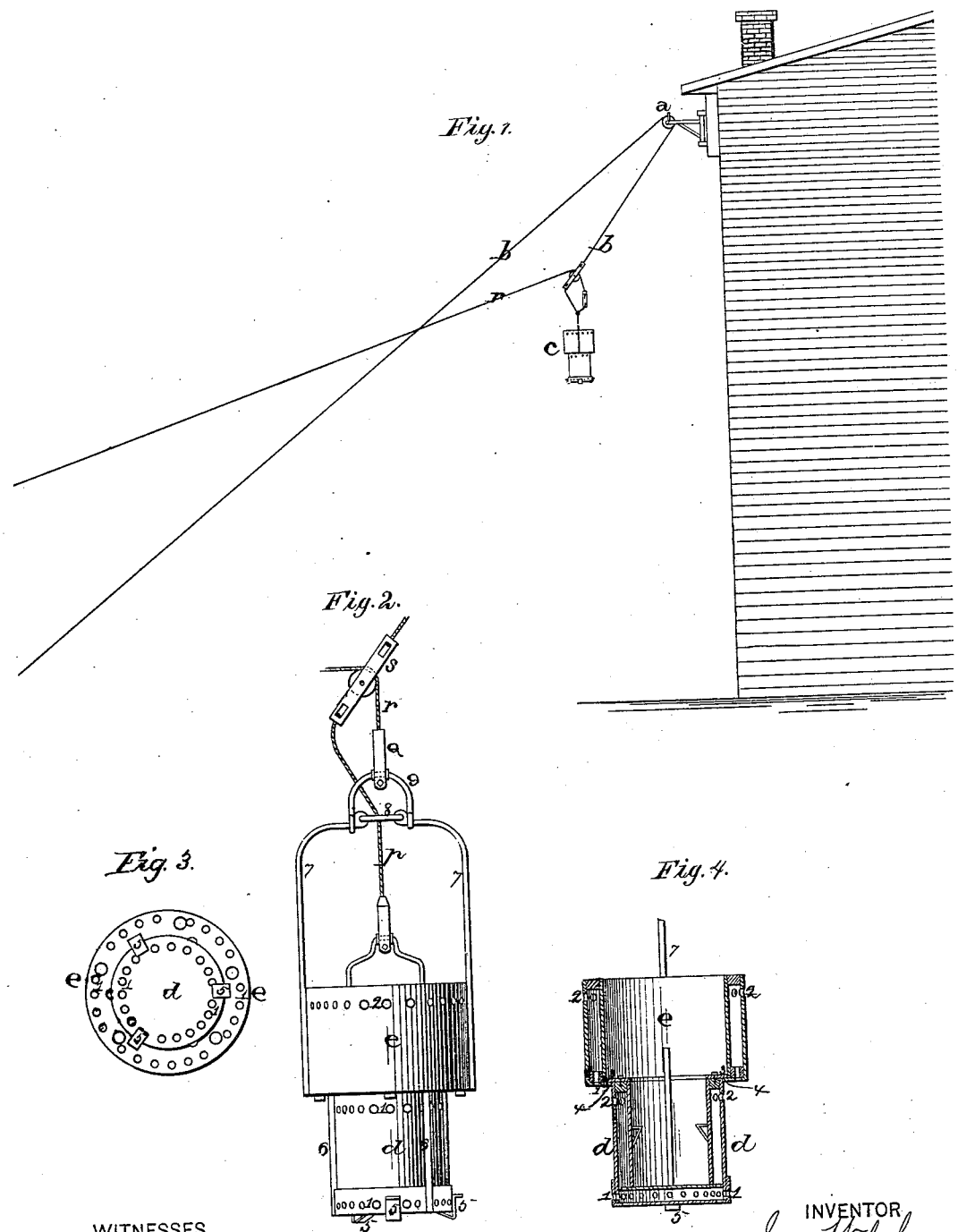

JOSEPH WELCH, OF DELPHOS, OHIO.

IMPROVEMENT IN FIRE-ESCAPES.

Specification forming part of Letters Patent No. 192,551, dated June 26, 1877; application filed June 2, 1877.

*To all whom it may concern:*

Be it known that I, Jos. WELCH, of Delphos, in the county of Van Wert and State of Ohio, have invented certain new and useful Improvements in Fire-Escapes; and I do hereby declare the following to be a full, clear, and exact description of the invention, such as will enable others skilled in the art to which it pertains to make and use it, reference being had to the accompanying drawings, which form part of this specification.

My invention relates to an improvement in fire-escapes; and it consists in the arrangement and combination of parts, that will be more fully described hereinafter, whereby a simple, cheap, and effective escape is provided from burning buildings.

The accompanying drawings represent my invention.

To the under side of the eaves of the house, or at any other suitable point of the house to which my escape is to be applied, there is secured a pulley, $a$, which may either be stationary or movable back and forth upon a swinging bracket. Over this roller is passed the rope $b$, which has one end fastened to the basket $c$ and the other extending down to the ground, so that the basket can be raised or lowered at will.

This basket $c$ is made in two sections, each one of which is about three feet deep. The smaller one, $d$, of these two sections is made to move up and down in the larger one, $e$, and when they are extended, as shown, they are together about six feet deep. Each of them is made of any suitable sheet-iron, and has walls of a double thickness, the space between the walls forming an air-chamber for the protection of the inside of the basket. At the lower edges or ends of each section are made a number of perforations, 1, and around the upper outer sides are also made a number of perforations, 2, through which the air freely passes.

By means of the perforations and the air-space, a constant circulation of air is kept up around the inside of each section, so that, even if the flames should dash against the side of the basket, those in the lower section, $d$, would suffer no inconvenience or harm therefrom.

The smaller section, $d$, is provided with the projecting flange 3 around its top edge, which catches over the top of a similar one, 4, in the bottom of the section $e$, and on the under side of the section $d$ are secured suitable stops 5.

By means of these flanges and stops the two sections can be closed up or opened out at will without becoming separated from each other, and the section $d$ is prevented from turning around inside of the other one, by means of the guide-rods 6, that are secured to its outside. The bail for the section $e$ is fastened to its outside, as shown, and between the upper ends of the two rods 7, that form this bail, is secured the ring 8, which forms a guide for the rope $p$, that is used to operate the section $d$. Also, secured to the upper ends of these rods 7 is a smaller bail, 9, to which is secured the rope $r$, that is used for drawing up the outer section. Each of these ropes has a metallic block, Q, fastened to it for attaching its end to their respective bails. To the rope $p$, at a suitable distance above the block Q, is fastened another block, $s$, in which is placed a pulley, and over this pulley, down to the ground, runs the rope $r$, while the rope $b$ runs over the pulley $a$ up under the eaves of the house.

In drawing up the basket the rope $p$ will be used, the one $r$ being left slack, so that the outer section will fall down to a level with the top of the section $d$. In this position, while closed up, people can step readily into the basket, when the outer section will be drawn up around them, to protect them from the flames and heat that may be bursting forth from the windows.

In order to guide the basket in its descent and keep it away from the windows through which flames may be bursting, the rope $r$ will be used, which will be fastened to the basket, so as to draw it outward from the building.

My invention having thus been described, I claim—

1. A basket for fire-escapes that is formed of two sections, one of which can be closed up within the other, substantially as shown.

2. A basket for fire-escapes made in two sections, each section being provided with a separate rope for operating it, substantially as set forth.

3. A basket for fire-escapes that is made of sheet metal and provided with a double thickness of walls, so as to form an air-chamber around the basket, as described.

In testimony that I claim the foregoing I have hereunto set my hand this 30th day of May, 1877.

JOSEPH WELCH.

Witnesses:
JOHN KING,
C. C. MARSHALL.